United States Patent
Stratton

(10) Patent No.: US 6,883,378 B2
(45) Date of Patent: Apr. 26, 2005

(54) LOW TCE FILL FLUID FOR BARRIER DIAPHRAGM PRESSURE SENSORS

(75) Inventor: Thomas G. Stratton, Roseville, MN (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 10/401,910

(22) Filed: Mar. 28, 2003

(65) Prior Publication Data

US 2004/0187586 A1 Sep. 30, 2004

(51) Int. Cl.[7] .................................................. G01L 7/08
(52) U.S. Cl. ............................. 73/715; 73/706; 73/717; 73/753
(58) Field of Search .................................. 73/700–756

(56) References Cited

U.S. PATENT DOCUMENTS

| | | | |
|---|---|---|---|
| 3,990,309 A | * 11/1976 | Beckwith et al. | 73/708 |
| 3,999,435 A | * 12/1976 | Siegel | 73/708 |
| 4,006,640 A | 2/1977 | Gealt | |
| 4,019,387 A | * 4/1977 | Siegel | 73/299 |
| 4,070,859 A | * 1/1978 | Sobecks | 60/530 |
| 4,303,903 A | 12/1981 | Matsuoka et al. | |
| 4,599,906 A | * 7/1986 | Freud et al. | 73/861.47 |
| 4,637,429 A | * 1/1987 | Dietiker et al. | 137/505.14 |
| 4,782,703 A | * 11/1988 | Nishi | 73/708 |
| 4,862,317 A | * 8/1989 | Kuisma | 361/283.1 |
| 4,926,155 A | 5/1990 | Colla et al. | |
| 5,186,055 A | * 2/1993 | Kovacich et al. | 73/727 |
| 6,046,667 A | 4/2000 | Mathias | |

FOREIGN PATENT DOCUMENTS

WO WO 02/40955 A2 5/2002

* cited by examiner

Primary Examiner—Edward Lefkowitz
Assistant Examiner—Jermaine Jenkins
(74) Attorney, Agent, or Firm—Schiff Hardin LLP

(57) ABSTRACT

A pressure sensor has a housing with an opening exposing a cavity, a barrier diaphragm across the opening, a pressure sensing element within the cavity, and a fill fluid within the cavity. The fill fluid comprises a fluid and a filler, the fluid has a TCE associated therewith, the housing has a TCE associated therewith, and the filler lowers the TCE of the fluid to a level matching the TCE of the housing. Accordingly, the housing and the fill fluid do not exhibit temperature induced dimensional changes relative to one another that cause plastic deformation of the barrier diaphragm.

43 Claims, 2 Drawing Sheets

LOW TCE FILL FLUID FOR BARRIER DIAPHRAGM PRESSURE SENSORS

TECHNICAL FIELD OF THE INVENTION

The present invention relates to a pressure sensor having a barrier diaphragm that retains a fill fluid in a cavity of the pressure sensor.

BACKGROUND OF THE INVENTION

Pressure sensors are used in a wide variety of applications in order to sense pressure. Such pressure sensors typically include a transducer that converts the pressure input to an electrical output signal. In some pressure sensors, the transducer is located in a cavity that is filled with a fluid and that is sealed by a diaphragm. Thus, the diaphragm acts as a barrier between the input pressure and the fill fluid. The diaphragm responds to the pressure input and transmits the pressure input through the fill fluid to the transducer. The transducer converts this pressure to the electrical output signal.

The fill fluid used for barrier diaphragm pressure sensors has a very high temperature coefficient of expansion (TCE) compared to the materials, typically stainless steel, forming the enclosure that confines the fill fluid. Therefore, as the pressure sensor is exposed to extreme temperatures, the fill fluid tends to expand more quickly than the enclosure resulting in a plastic deformation of the barrier diaphragm.

The present invention solves this and/or other problems.

SUMMARY OF THE INVENTION

In accordance with one aspect of the present invention, a pressure sensor comprises a housing having an opening exposing a cavity, a barrier diaphragm across the opening, a pressure sensing element supported within the cavity, and a fill fluid within the cavity. The fill fluid comprises a fluid mixed with a filler, the fluid has a TCE, and the filler is selected to lower the TCE of the fill fluid.

In accordance with another aspect of the present invention, a pressure sensor comprises a housing having a cavity, a barrier diaphragm in communication with the cavity, a pressure sensing element within the cavity, and a fill fluid within the cavity. The fill fluid comprises a fluid and a filler, the fluid has a TCE associated therewith, the housing has a TCE associated therewith, and the filler lowers the TCE of the fill fluid to a level more closely matching the TCE of the housing.

In accordance with still another aspect of the present invention, a pressure sensor comprises a housing, a pressure sensing element, a diaphragm stop, a barrier diaphragm, electrical conductors, and a fill fluid. The housing has an opening exposing a cavity. The pressure sensing element is supported by the housing within the cavity. The diaphragm stop is within the cavity, and the pressure sensing element is between the diaphragm stop and the housing. The barrier diaphragm is across the opening, and the diaphragm stop is between the pressure sensing element and the barrier diaphragm. The electrical conductors extends through the housing and electrically engages the pressure sensing element. The fill fluid is within the cavity, the fill fluid has a TCE, the housing has a TCE, and the TCE of the fill fluid has a value relative to the TCE of the housing so as to prevent plastic deformation of the barrier diaphragm.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
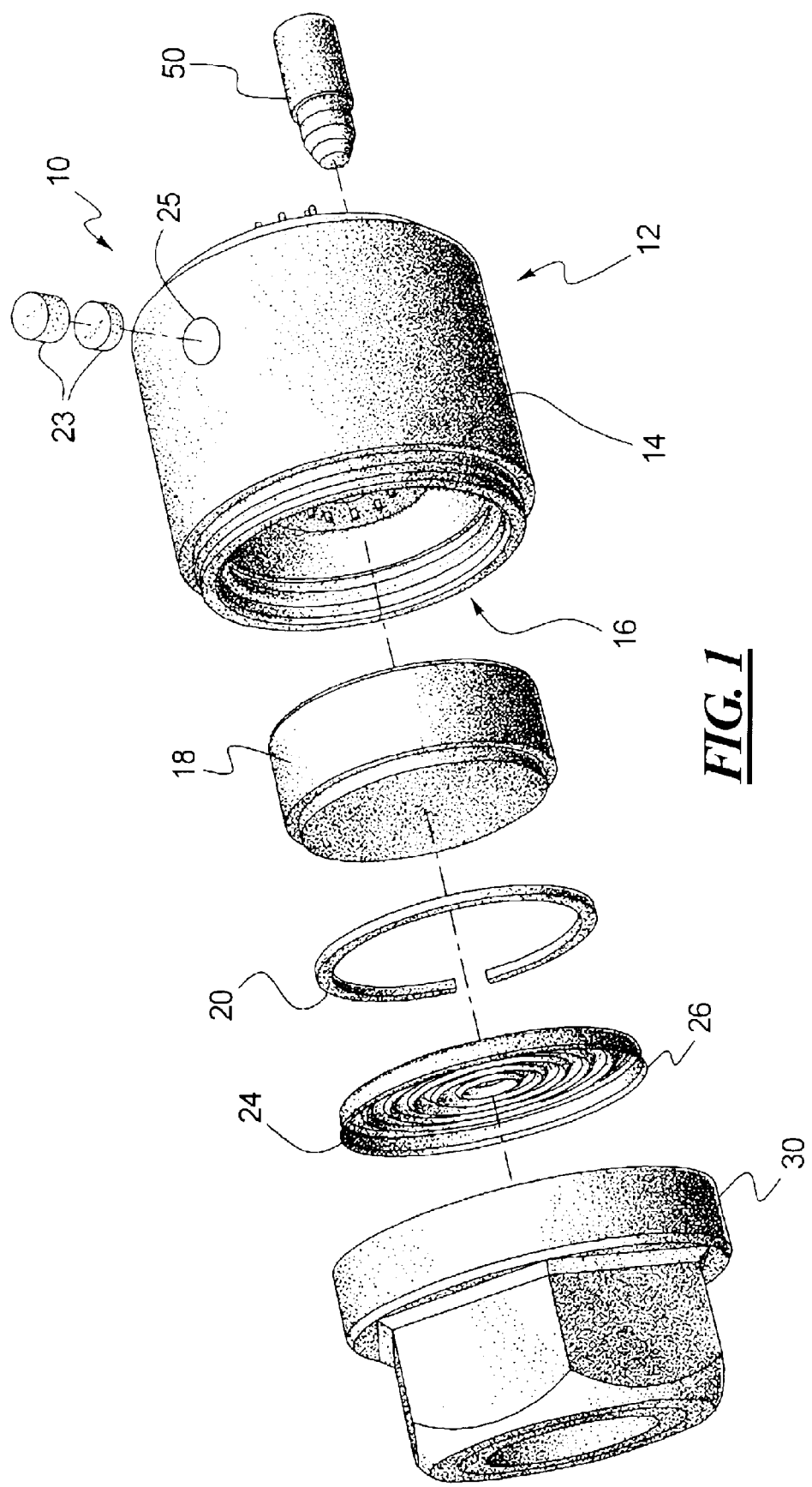
FIG. 1 illustrates an exploded view of a pressure sensor in accordance with one embodiment of the present invention.
Figure 3:
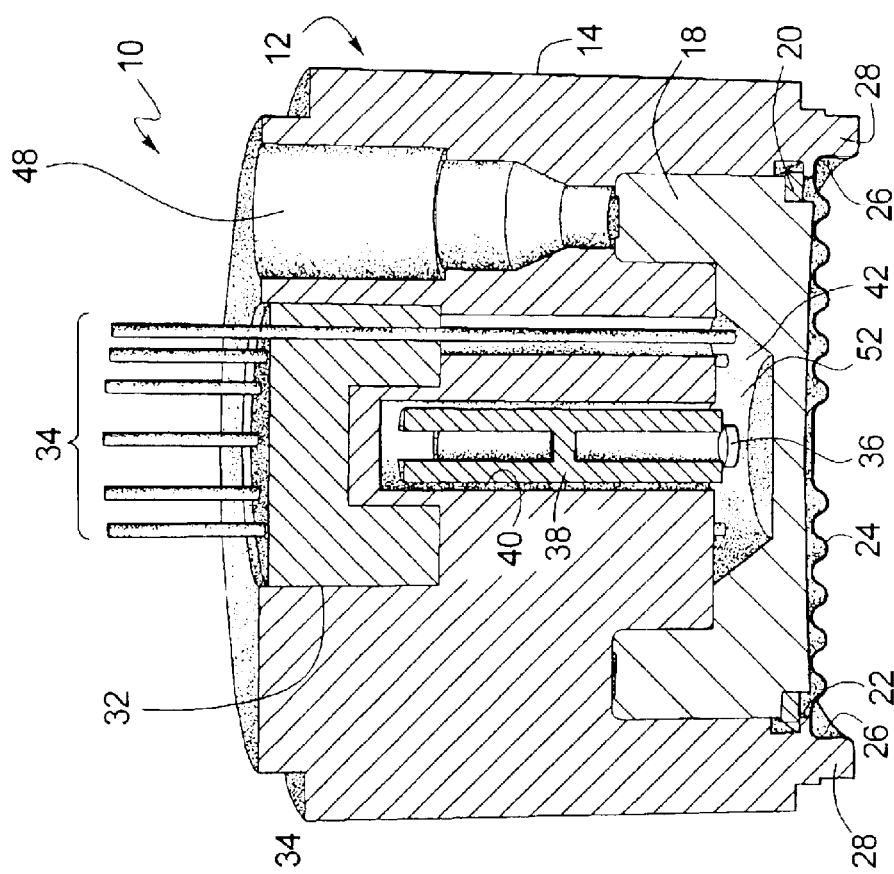
FIG. 3 is a cross sectional view of the sensor assembly and barrier diaphragm of the pressure sensor of FIG. 1.
Figure 2:
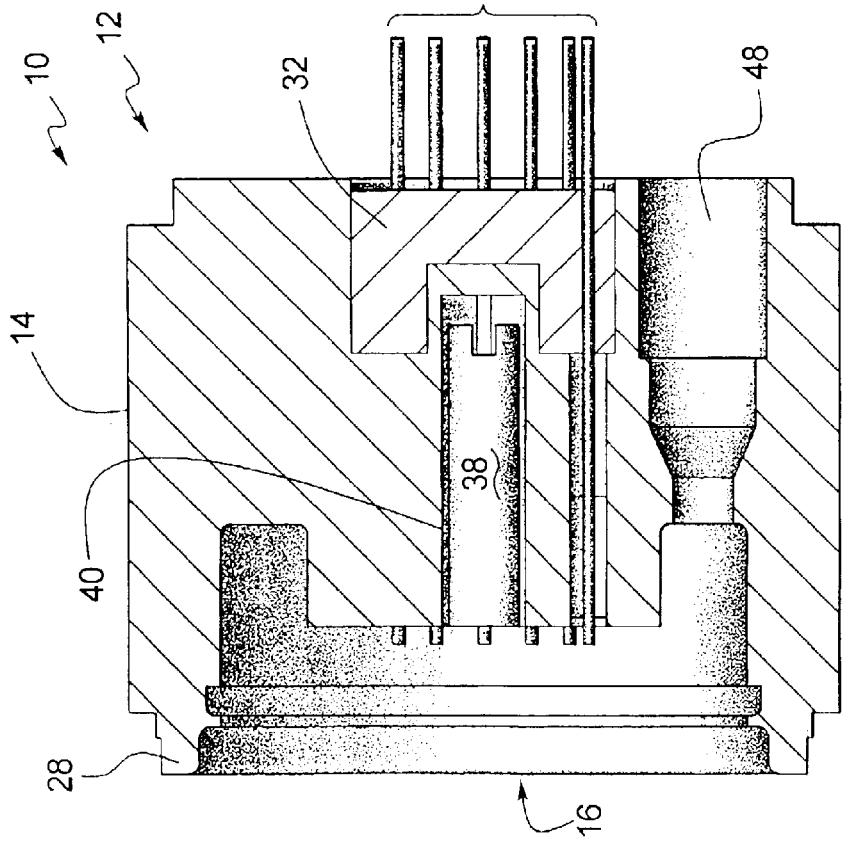
FIG. 2 is a cross sectional view of the sensor assembly of FIG. 1.

As shown in FIGS. 1, 2, and 3, a pressure sensor 10 includes a sensor assembly 12 having a housing body 14. The housing body 14 has an opening 16 that receives a diaphragm stop 18. When the diaphragm stop 18 is inserted through the opening 16 and fully engages the housing body 14 as shown in FIG. 3, a retainer ring 20 is snapped into a recess 22 formed in the housing body 14 so as to retain the diaphragm stop 18 in the housing body 14. Alternatively, the diaphragm stop 18 may be retained in the housing body 14 by use of a weld instead of the retainer ring 20.

One or more sintered plugs 23 may be used in combination with a hole through the housing body 14 in order to provide a path from the outside of the pressure sensor 10 to the back side of a sensor die 36 (discussed below). This path implements the pressure sensor 10 as a gauge pressure sensor. The one or more plugs 23 are not present when the pressure sensor 10 is to be used to measure absolute pressure.

A barrier diaphragm 24 covers the opening 16. The barrier diaphragm 24 has an outer circumference 26 that engages an annular lip 28 of the housing body 14 at the opening 16. The barrier diaphragm 24 may be attached to the housing body 14 by a weld around the annular lip 28. A pressure adapter 30 may be arranged to thread over the annular lip 28 or be welded to housing body 14 so as to couple a pressure to be sensed to the housing body 14. The barrier diaphragm 24 thus forms a seal for the housing body 14.

A connector plug 32 fills and seals the end of the housing body 14 that is opposite the opening 16. The connector plug 32, for example, may be an elastomeric plug. The connector plug 32 has electrical conductors 34 therethrough. The electrical conductors 34 are coupled to the sensor die 36 that is supported by a die support 38 located within a recess 40 of the housing body 14. The die support 38 supports the sensor die 36 so that the sensor die 36 is positioned within a cavity 42 between the barrier diaphragm 24 and the housing body 14. The purpose of the connector plug 32 is to provide mechanical strain relief to the electrical conductors 34. Although the connector plug 32 is shown as a plug, the connector plug 32 could instead be formed in place by, for example, filling the volume with epoxy and curing the epoxy.

A fill hole 48 extends through the housing body 14 and communicates with the cavity 42 through and/or around the diaphragm stop 18. A fill plug 50 is inserted into a fill hole 48. A fill fluid 52 is supplied through the fill plug 50 and fills the cavity 42. The fill fluid 52 transmits pressure on the barrier diaphragm 24 to the sensor die 36. The sensor die 36 converts this pressure to an electrical signal and communicates this electrical signal through one or more of the electrical conductors 34 to the exterior of the housing body 14. The sensor die 36 is provided by Honeywell International under parts number 22025995-002.

The housing body 14, for example, may be a stainless steel body. Similarly, the barrier diaphragm 24 may be stainless steel. The diaphragm stop 18 may be alloy steel, stainless steel, or ceramic, and the retainer ring 20 may be stainless steel or spring steel.

The fill fluid 52 is chosen so that it has a TCE more closely matching the TCE of the housing body 14. Accordingly, the housing body 14 and the fill fluid 52 do not exhibit temperature induced dimensional changes relative to one another to such an extent that the barrier diaphragm 24 undergoes a plastic deformation.

The fill fluid 52 may be a low TCE fill fluid. For example, the fill fluid 52 may be a combination of a fluid, such as a silicon fluid, and a filler, such as particles having a low TCE. As a more particular example, the fluid of the fill fluid 52 may be silicon polydimethylsiloxane, and the filler may be ceramic oxide particles. As a still more particular example, the fluid may be DC200 supplied by Dow Corning, or DC210H, which is a high temperature fill fluid also supplied by Dow Corning, and the filler may be particles of silicon dioxide.

The filler is added to the fluid to lower the TCE of the fluid. The filler should be mixed with the fluid so that the filler is uniformly distributed throughout the fluid. The filler, for example, may be a fine monodispersed powder having a particle size of around 1 micron. The particles of the filler are preferably, although not necessarily, spherical. The fill fluid 52 may comprise 50% fluid and 50% filler by volume.

The linear thermal expansion coefficient for 316 stainless steel, which can be used for the stainless steel parts described above, may be on the order of $16.5 \times 10^{-6}$ m/m/deg C. or a volume thermal expansion coefficient of $50 \times 10^{-6}$ m$^3$/m$^3$/deg C. The volume thermal expansion coefficient of the fill fluid, DC200H, with no filler is about $950 \times 10^{-6}$ m$^3$/m$^3$/deg C. The volume thermal expansion coefficient of the fill fluid with filler is about $476 \times 10^{-6}$ m$^3$/m$^3$/deg C.

Accordingly, the fill fluid 52 has a lower temperature coefficient of expansion (TCE) because of the filler than it would have had without the filler. The fill fluid 52 may have a temperature coefficient of expansion (TCE) that is higher than the TCE of the housing body 14 (as well as relevant other parts, such as stainless steel parts, of the pressure sensor 10). Therefore, as the pressure sensor 10 is exposed to extreme temperatures, the fill fluid 52 does not expand so quickly that plastic deformation of the barrier diaphragm 24 results.

An alternative to the present invention is to build a sensor with a housing body and a barrier diaphragm having a diameter that is large enough to avoid plastic deformation of the barrier diaphragm as a result of extreme temperature excursions. However, such a pressure sensor will be much larger than the pressure sensor 24 described herein. Small size is an advantage in most pressure sensors.

Certain modifications of the present invention have been described above. Other modifications will occur to those practicing in the art of the present invention. For example, as described above, the housing body 14, the barrier diaphragm 24, the diaphragm stop 18, and the retainer ring 20 may be stainless steel. However, these elements may be other materials or different combinations of other materials that can benefit from the present invention.

The fill fluid 52 may be either conducting or non-conducting depending on application.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A pressure sensor comprising:
   a housing having an opening exposing a cavity;
   a barrier diaphragm across the opening;
   a pressure sensing element supported within the cavity; and,
   a fill fluid within the cavity, wherein the fill fluid comprises a fluid mixed with a filler, wherein the fluid has a TCE, and wherein the filler is selected to lower the TCE of the fill fluid.

2. The pressure sensor of claim 1 wherein the filler is monodispersed throughout the fluid.

3. The pressure sensor of claim 2 wherein the filler comprises particles having a particle size of about 1 micron.

4. The pressure sensor of claim 3 wherein the particles have spherical shapes.

5. The pressure sensor of claim 4 wherein the particles comprise ceramic oxide particles.

6. The pressure sensor of claim 4 wherein the particles comprise silicon dioxide particles.

7. The pressure sensor of claim 4 wherein the fluid comprises a silicon based fluid.

8. The pressure sensor of claim 4 wherein the particles comprise 50% by volume of the fill fluid.

9. The pressure sensor of claim 1 wherein the filler is uniformly distributed through the fluid.

10. The pressure sensor of claim 9 wherein the filler comprises particles having a particle size of about 1 micron.

11. The pressure sensor of claim 9 wherein the filler comprises particles having spherical shapes.

12. The pressure sensor of claim 11 wherein the particles have a particle size of about 1 micron.

13. The pressure sensor of claim 9 wherein the filler comprises 50% by volume of the fill fluid.

14. The pressure sensor of claim 1 wherein the filler is selected to lower the TCE of the fluid by 50%.

15. The pressure sensor of claim 1 wherein the filler comprises particles having spherical shapes.

16. The pressure sensor of claim 1 wherein the filler comprises ceramic oxide particles.

17. The pressure sensor of claim 1 wherein the filer comprises silicon dioxide particles.

18. A pressure sensor comprising:
    a housing having a cavity;
    a barrier diaphragm in communication with the cavity;
    a pressure sensing element within the cavity; and,
    a fill fluid within the cavity, wherein the fill fluid comprises a fluid and a filler, wherein the fluid has a TCE associated therewith, wherein the housing has a TCE associated therewith, and wherein the filler lowers the TCE of the fill fluid to a level more closely matching the TCE of the housing.

19. The pressure sensor of claim 18 wherein the filler comprises particles having a particle size of about 1 micron.

20. The pressure sensor of claim 18 wherein the filler comprises particles having spherical shapes.

21. The pressure sensor of claim 20 wherein the particles have a particle size of about 1 micron.

22. The pressure sensor of claim 21 wherein the particles comprise ceramic oxide particles.

23. The pressure sensor of claim 21 wherein the particles comprise 50% by volume of the fill fluid.

24. The pressure sensor of claim 21 wherein the fluid comprises a silicon based fluid.

25. The pressure sensor of claim 24 wherein the particles comprise ceramic oxide particles.

26. The pressure sensor of claim 18 wherein the filler is uniformly distributed throughout the fluid.

27. The pressure sensor of claim 26 wherein the filler comprises particles having a size of about 1 micron.

28. The pressure sensor of claim 26 wherein the filler comprises particles having spherical shapes.

29. The pressure sensor of claim 28 wherein the particles have a particle size of about 1 micron.

30. The pressure sensor of claim 26 wherein the particles comprise 50% by volume of the fill fluid.

31. The pressure sensor of claim 18 wherein the filler comprises 50% by volume of the fill fluid.

32. The pressure sensor of claim 18 wherein the filler comprises particles having spherical shapes.

33. The pressure sensor of claim 18 wherein the filler comprises ceramic oxide particles.

34. The pressure sensor of claim 18 wherein the filer comprises silicon dioxide particles.

35. A pressure sensor comprising:

a housing having an opening exposing a cavity;

a pressure sensing element supported by the housing within the cavity;

a diaphragm stop within the cavity, wherein the pressure sensing element is between the diaphragm stop and the housing;

a barrier diaphragm across the opening, wherein the diaphragm stop is between the pressure sensing element and the barrier diaphragm;

electrical conductors extending through the housing and electrically engaging the pressure sensing element; and, a fill fluid within the cavity, wherein the fill fluid has a TCE, wherein the housing has a TCE, and wherein the TCE of the fill fluid has a value relative to the TCE of the housing so as to prevent plastic deformation of the barrier diaphragm.

36. The pressure sensor of claim 35 wherein the fill fluid comprises in part particles having a particle size of about 1 micron.

37. The pressure sensor of claim 35 wherein the fill fluid comprises in part particles having spherical shapes.

38. The pressure sensor of claim 35 wherein the fill fluid comprises in part ceramic oxide particles.

39. The pressure sensor of claim 35 wherein the fill fluid comprises in part a silicon based fluid.

40. The pressure sensor of claim 39 wherein the fill fluid comprises in part ceramic oxide particles.

41. The pressure sensor of claim 35 wherein the fill fluid contains particles having a size of about 1 micron, and wherein the particles having spherical shapes.

42. The pressure sensor of claim 35 wherein the fill fluid comprises in part a particulate filler, and wherein the particulate filler comprises 50% by volume of the fill fluid.

43. The pressure sensor of claim 35 wherein the fill fluid comprises a fluid and a filler, wherein the fluid has a TCE, wherein the housing has a TCE, and wherein the filler lowers the TCE of the fluid to a level matching the TCE of the housing.

* * * * *

UNITED STATES PATENT AND TRADEMARK OFFICE
CERTIFICATE OF CORRECTION

PATENT NO. : 6,883,378 B2
DATED : April 26, 2005
INVENTOR(S) : Thomas G. Stratton It is certified that error appears in the above-identified patent and that said Letters Patent is hereby corrected as shown below:

Column 5,
Line 9, change "claim 26" to -- claim 29 --.

Signed and Sealed this

Twenty-seventh Day of September, 2005

JON W. DUDAS
*Director of the United States Patent and Trademark Office*